July 12, 1966     J. W. COLTMAN     3,260,977
ELECTRICAL APPARATUS

Original Filed May 16, 1962     2 Sheets-Sheet 1

WITNESSES:
Bernard P. Giegues
David H. Gould

INVENTOR
John W. Coltman
BY
F. E. Browder
ATTORNEY

July 12, 1966   J. W. COLTMAN   3,260,977
ELECTRICAL APPARATUS

Original Filed May 16, 1962   2 Sheets-Sheet 2

United States Patent Office 3,260,977
Patented July 12, 1966

3,260,977
ELECTRICAL APPARATUS
John W. Coltman, Pittsburgh, Pa., assignor to Westinghouse Electric Corporation, Pittsburgh, Pa., a corporation of Pennsylvania
Continuation of application Ser. No. 195,108, May 16, 1962. This application July 2, 1964, Ser. No. 380,990
7 Claims. (Cl. 336—181)

This application is a continuation of application Serial No. 195,108, now abandoned, filed May 16, 1962 and assigned to the same assignee as this application.

This invention relates in general to inductive electrical apparatus and, more particularly, to the windings of inductive electrical apparatus.

Inductive apparatus of the prior art, such as transformers, have generally relied upon iron cores to achieve a close coupling between windings, or small leakage inductance. When superconducting current-carrying conductors are employed, the iron core presents grave difficulties in regard to thermal losses into the cooling medium. Transformers with air cores have hitherto not been usable at ordinary power line frequencies because of excessive leakage inductance, i.e. failure to include in the secondary essentially all of the flux generated by the primary.

Accordingly, it is a general object of this invention to provide a new and improved winding for electrical inductive apparatus.

It is a more particular object of this invention to provide a new and improved winding for electrical inductive apparatus which reduces to an extreme minimum the leakage inductance while stressing the insulation between primary and secondary windings uniformly and at a low value.

A further object of this invention is to provide a transformer in which the voltage between adjacent portions of the primary and secondary windings never exceeds the potential of the low voltage winding, regardless of the total voltage of the high voltage winding.

A still further object of this invention is to provide a transformer in which surge voltages are so distributed as to stress the insulation a minimal amount.

Yet another object of this invention is to provide a transformer which is operable over a very wide range of frequencies.

Briefly, the present invetion accomplishes the above cited objects by providing a coaxial or otherwise closely coupled pair of continuous conductors wound as a coil or series of coils, provided with suitable magnetic core means if magnetic core means are required for the particular application, and having the coil tapped at intervals and interconnected in a particular manner. More specifically, to provide a step-up transformer the outer conductor is pierced at a point corresponding to the desired primary inductance from the low potential end of the coil and a tap is brought out from the center conductor. A tap is made close to the same point on the outer conductor. This tapping is repeated at intervals, the number of coil intervals thus formed being one less than the desired step-up ratio. The taps are then interconnected in a unique manner to provide the desired output voltage.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
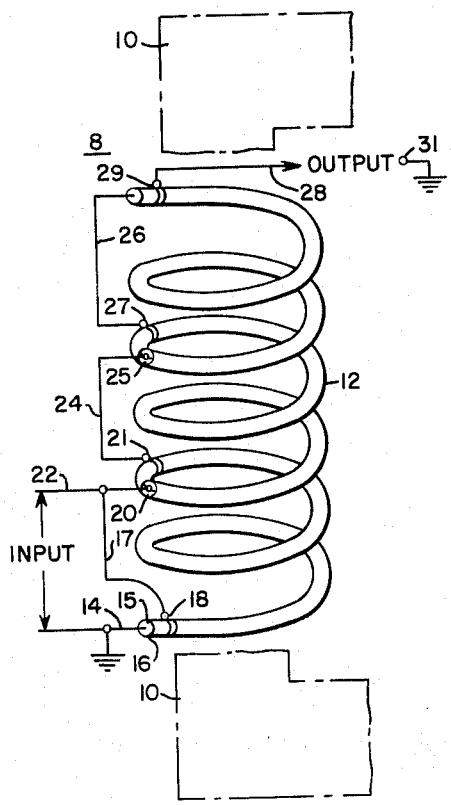
FIGURE 1 is a side elevation of an embodiment of the invention, with an optional magnetic core shown in partial outline.

Referring to the drawings and in particular to FIG. 1, a transformer coil and core assembly 8 is shown comprising an optional magnetic core 10 and a coil 12. It is to be understood that core 10 is a closed magnetic circuit although for clarity the core is shown cut away. For some purposes it is possible to dispense with the magnetic core altogether. The coil 12, which in practice would have many more turns than shown in the figure, is comprised of a continuous central conductor 14 of circular cross section, surrounded by electrical insulation 15 over which is a second hollow continuous conductor 16 also of circular cross section. It is to be noted that the two conductors have a common longitudinal axis.

In a step-up transformer, the low voltage input to the transformer core and coil assembly 8 is applied across a first portion or interval of the inner conductor 14 in the following way. The grounded side of the input voltage is connected directly to the inner conductor 14 of coil 12. The outer conductor and insulation are pierced at a point of desired primary inductance 20 from the low potential input end of coil 12. A tap is brought out at this point to connect the inner conductor 14 to the ungrounded low voltage lead 22. This lead is also connected by lead 17 through a sleeve-type connector 18 to the lower end of the outer conductor 16 of coil 12. A sleeve-type connector 21 is provided on the outside of conductor 16 of coil 12 as close to point 20 as possible. This tapping and attaching of connectors is repeated at intervals along coil 12. A lead 24 is attached at one end to connector 21 and at the other end of the inner conductor tap at a point 25. Close to point 25, connector 27 is atached to the outer conductor 16 of coil 12. A lead 26 is run from connector 27 to the upper end of coil 12 and is attached to the inner conductor 14 of coil 12 by a suitable means such as welding. Connector 29 is fastened to the outer conductor of coil 12 and a lead 28 is run from the connector 29 to provide one side of the high voltage output. The other side of the high voltage output is supplied by ground terminal 31.

Because substantially all the magnetic flux produced by the inner conductor 14 is included within the outer conductor 16 the coefficient of coupling between the two conductors is essentially unity.

The leakage inductance associated with each coil interval is approximately the inductance appearing at the terminals of a shorted coaxial conductor whose length is that of the coil interval used. This value is extraordinarily low, and is independent of the manner in which the winding is disposed in the coil. Thus, it will be appreciated that the input voltage applied to the inner or primary conductor 14 between ground and point 20 will induce a substantially equal voltage across the outer or secondary conductor 16 between connector 18 and connector 21. The bottom end of the outer or secondary conductor is connected to the high potential end of the input, so that the voltage from ground at the first outer conductor tap 21 is the sum of the applied voltage and the voltage induced in the first interval of the coil. The difference between this voltage and the voltage of the inner tap at point 20 is used to drive the primary of the second interval of the transformer coil 12 between point 20 and point 25. This step-up action is repeated for as many transformer coil intervals as is necessary to achieve the desired output voltage. It is to be understood that magnetic coupling between transformer coil intervals, while it may in some cases be beneficial, is not required, and each transformer coil interval may be wound on its own separate magnetic core.

To avoid introducing additional leakage inductance, the overall coil should be so disposed as to make the unshielded connections such as conductors 24 and 26 as short as possible. Alternatively, the connections may be arranged so that succeeding pairs of connecting leads are run parallel to each other, with the currents in the leads in counterflow.

Figure 2:
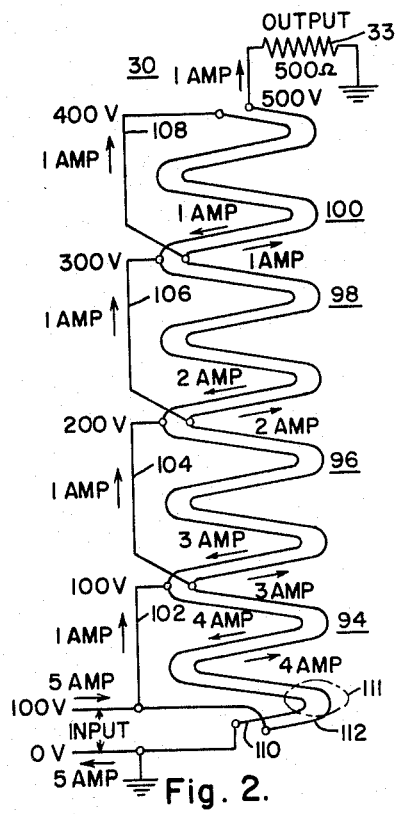
FIG. 2 is a diagrammatic representation of a four-section embodiment of the invention showing approximate voltage and current distribution.

Referring now particularly to FIG. 2, a schematic diagram 30 of an embodiment of the invention is shown to illustrate the electrical properties of the circuit. The continuous inner conductor 110 of a coaxial coil 111 is connected in circuit relationship to the continuous outer conductor 112 of the coaxial coil 111. This embodiment of the invention employs four tapped coaxially wound transformer intervals 94, 96, 98 and 100 interconnected with leads 102, 104, 106 and 108. A resistive load 33 of 500 ohms is applied between ground and the upper end of outer conductor 112 of transformer interval 100. Assuming an input voltage of 100 volts and an input current of five amperes, and neglecting for simplicity the magnetizing current and transformer losses, the current distribution will be so illustrated. If tap and clamp transformer interval connections are located at 100 volt intervals the input current of five amperes will divide with four amperes going up the outer conductor 112 of transformer interval 94. The other one ampere will flow upward through interconnection lead 102. In transformer interval 96, three amperes will flow upward through the continuous outer or secondary conductor 112; one ampere will flow upward in interconnection lead 104 and the potential of this lead will be 200 volts with respect to ground. In transformer interval 98, the potential of interconnection lead 106 will be 300 volts and the current will be one ampere; the current in the outer or secondary conductor 112 of transformer interval 98 will be reduced to two amperes. In the top transformer interval 100, the current in the outer or secondary conductor 112 is reduced still further to one ampere while the current in interconnecting lead 108 is one ampere at 400 volts. The output voltage of 500 volts is applied across 500 ohms load resistor 33 between the top end of the secondary conductor 112 of the transformer interval 100 and ground; one ampere will flow in the load. It is to be noted that the potential between primary and secondary conductors 110 and 112 is at every point along the coaxial coil 111 equal to the low input voltage. Because the insulation between primary and secondary is so uniformly stressed, the insulation may be stressed relatively highly. It is to be further noted that in each interval of the transformer the load current that flows in the inner conductor 110 is equal and opposite to the load current in the outer conductor 112. The magnetic field due to these currents is thus zero outside of the coaxial conductor. Only the field due to the magnetizing current exists outside the conductors. This is of benefit in avoiding quenching effects in superconductors. The current carrying capacity of the interconnections 102, 104, 106 and 108 need only be great enough to carry the output current.

Figure 3:
FIG. 3 is an end view of two coaxial conductors, insulated from each other, which may be used in the invention.
Figure 6:
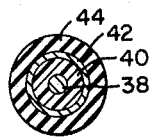
FIG. 6 is an end view of two coaxial conductors insulated from each other and insulated from ground by an overall layer of electrical insulation.

Referring to FIGS. 3 and 6, there are shown end views of two types of coaxial windings that may be used in the invention.

FIG. 3 shows a conductor of circular cross section 32 covered with a layer of insulation 34. Over the insulation is a hollow conductor of circular cross section 36.

FIG. 6 shows a central conductor of circular cross section 38 surrounded by insulation 40. A hollow conductor of circular cross section 42 is external to the insulation 40. Another layer of insulation 44 is applied over the hollow conductor 42 to prevent turn-to-turn short circuits should a transformer be wound with adjacent turns of coaxial conductor of the type shown in FIG. 6 in contact. Insulation 44 will also electrically insulate the conductor 42 of FIG. 6 from a transformer core should such a core be used. It will be understood that the coaxial conductors of FIGS. 3 and 6 may, for the sake of economy, be graded in diameter in the various sections of the invention to suit the currents being handled.

Figure 5:
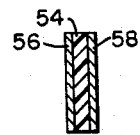
FIG. 5 is an end view of an alternative strap or foil winding combination for the invention.
Figure 7:
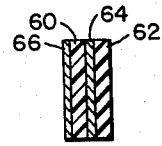
FIG. 7 is an end view of another alternative strap or foil combination that may be used in the invention.

Referring to FIGS. 5 and 7 of the drawings, there are shown end views of two types of strap or foil windings that may be used in the invention.

FIG. 5 shows two parallel flat conductors 56 and 58 separated by insulation 54.

FIG. 7 shows two parallel flat conductors 66 and 64 separated by insulation 60. An additional layer of electrical insulation 62 is added to the outer side of conductor 64 to electrically insulate the conductor 64 from adjacent turns or from a magnetic core should such a core be used.

Figure 4:
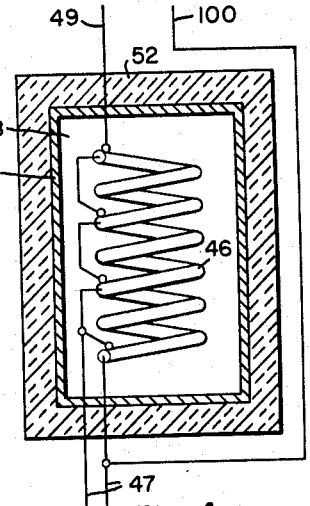
FIG. 4 is a transverse sectional view of an embodiment of the invention operating in a container adapted to provide cooling to extremely low temperatures.

Referring to FIG. 4 of the drawings, there is shown a coreless embodiment of the invention for operation at extremely low temperatures where the resistance of the conductor material, e.g. lead or niobium, is substantially reduced. These temperatures will be referred to hereinafter as cryogenic temperatures. It will be understood that the term "cryogenic temperatures" shall be taken to mean temperatures at which conductor resistance is much less than at room temperature. A closed container 50 is provided to enclose continuous coiled coaxial conductors 46 which are interconnected in accordance with the teachings of the invention. The interior 48 of the closed metal container is cooled by means such as liquid helium which for simplicity is not shown. The cooling serves to reduce the resistance of coil 46 to a negligible value. The outside of container 50 is insulated with low temperature thermal insulation 52 to minimize the influx of heat to the chamber 48. The entire assembly may be further enclosed in a suitable vessel (not shown) at an intermediate temperature, as that of liquid nitrogen. Two low voltage leads 47 and a high voltage output lead 49 are provided to connect the invention to external circuits. It should be noted that the input and output leads will conduct heat as well as electricity into chamber 48. It is, therefore, desirable that the leads be of the minimum cross sectional area consistent with current carrying capacity. The number of leads entering the supercooled chamber 48 can be held to three if a common connection 100 is made between input and output circuits exterior to container 50. The preferred material for container 50 is a superconducting metal because of the magnetic shielding effect of such a material, without attendant losses from induced currents.

Figure 8:
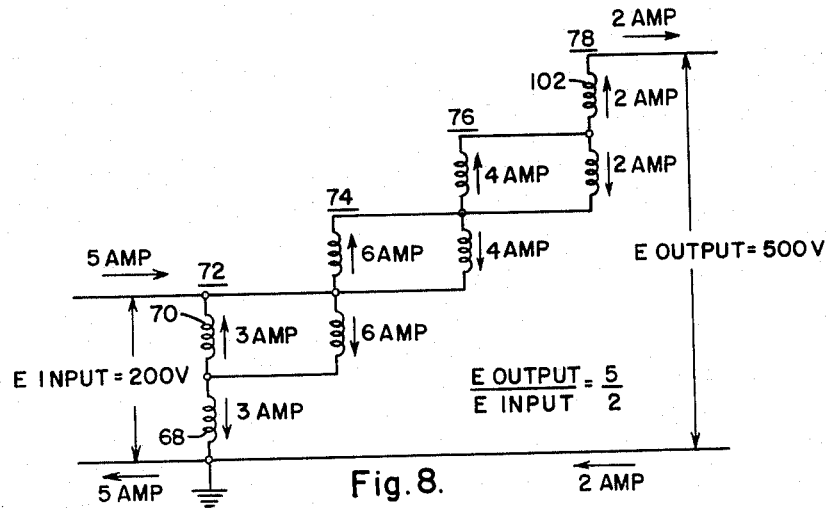
FIG. 8 shows an embodiment of the invention for obtaining a fractional transformation ratio.

Referring to FIG. 8, there is illustrated a schematic diagram of another embodiment of the invention designed to obtain fractional rather than integral values of voltage ratio. It is constructed of four equal transformer intervals 72, 74, 76 and 78 interconnected according to the teachings of the invention. Each transformer interval comprises a primary conductor and a secondary conductor as illustrated by primary conductor 68 and secondary conductor 70 of transformer interval 72. While these conductors are shown schematically as separate coils, it is to be understood that physically each coil interval is composed of coaxial or other closely spaced conductors wound simultaneously with each conductor continuous through the transformer. The low voltage input is applied across the series combination of primary 68 and secondary 70 of transformer interval 72. The high voltage output is taken between the top end of the secondary winding 102 of transformer interval 78 and the lower end of primary winding 68 of transformer interval 72.

Illustrative values of voltages and currents (neglecting a small magnetizing current) are shown on the respective portions of the circuit. Inspection will show that the overall voltage ratio is now 5/2. At the same time, the voltage on each section is 100 volts, and opposite and equal currents are carried by the primary and secondary of each section.

Figure 9:
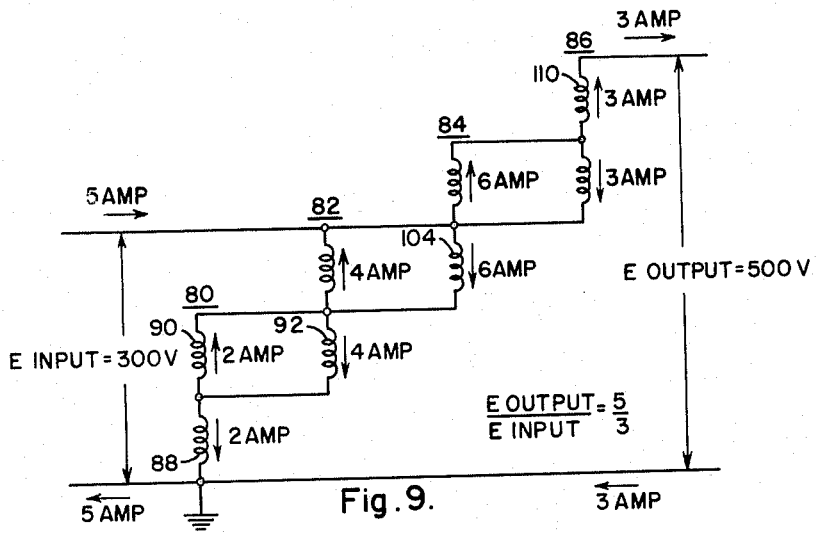
FIG. 9 shows another embodiment of the invention for obtaining a different fractional ratio of transformation.

Similarly, referring to FIG. 9, there is illustrated a schematic diagram of an embodiment of the invention comprising four equal transformer intervals 80, 82, 84 and 86 interconnected according to the teachings of the invention. Each transformer section comprises a primary conductor and a secondary conductor as illustrated by primary conductor 88 and secondary conductor 90 of transformer interval 80. It will be understood that while the conductors 88 and 90 are shown as separate coils, physically each transformer coil section is composed of coaxial or other closely spaced continuous conductors wound simultaneously.

The input voltage is applied across three transformer primary intervals 88, 92 and 104 in series. Again the conditions of uniform potential difference between primary and secondary of each transformer interval, and equal and opposite load currents in the primary and secondary conductors of each interval are satisfied. The high voltage output is taken between the upper end of the secondary winding 110 of transformer interval 86 and ground. The result is that the output voltage is effectively across five transformer intervals in series. The voltage transformation ratio of the transformer is now 5:3. Illustrative values of voltages and currents (neglecting a small magnetizing current) are shown on the respective portions of the circuit.

It is to be understood in FIGS. 2, 8 and 9 that separate magnetic cores may be used in each of the transformer intervals or each transformer interval may be wound on the same magnetic core. As previously mentioned, an iron core may under some conditions be dispensed with altogether. Although throughout the illustrations a single phase embodiment of the invention is shown, it will be understood that a multi-phase embodiment of the invention has been contemplated as well.

It will, therefore, be apparent that there has been disclosed a new and improved transformer which has extremely tight coupling and low voltage difference between primary and secondary windings.

While there have been shown and described what are at present considered to be preferred embodiments of the invention, modifications thereto will readily occur to those skilled in the art. For example, the invention may be used for step-down transformers or the outer conductor may be used as the primary winding.

Furthermore, it is not required that the various transformer intervals between taps be equally spaced provided only that corresponding primary and secondary windings, e.g. 68 and 70 of FIG. 8, are as nearly identical as the tap location will permit.

It is not desired, therefore, that the invention be limited to the specific arrangements shown and described and it is intended to cover in the appended claims all such modifications as fall within the true spirit and scope of the invention.

I claim as my invention:

1. An electrical transformer comprising a primary winding, a secondary winding disposed in inductive relation with said primary winding, means for connecting said primary and secondary windings to input and output circuits, taps disposed on said primary and secondary windings at predetermined intervals, means connecting said taps to apply a voltage induced in one interval of said secondary winding to the succeeding interval of said primary winding.

2. An electrical transformer comprising a primray winding, a secondary winding disposed in inductive relation with said primary winding, means for connecting said primary and secondary windings to input and output circuits, magnetic core means inductively associated with said primary and secondary windings, taps disposed on said primary and secondary windings at predetermined intervals, means connecting said taps to apply a voltage induced in the secondary winding of one interval by the primary winding of that interval, to the succeeding interval of said primary winding.

3. An electrical transformer comprising a coil having inner and outer coaxial conductors separated by insulating means, means for connecting said inner and outer conductors to input and output circuits, taps disposed on said inner and outer conductors along said coil to divide said coil into intervals between taps, means connecting each of certain taps on said outer conductor with a tap on the inner conductor of the succeeding interval of said coil, and cooling means to lower the temperature of said coil.

4. An electrical transformer comprising, a primary winding of a first sheet conductor, a secondary winding of a second sheet conductor disposed in close proximity to said primary winding, taps disposed on said primary and secondary windings which divides said transformer into intervals between said taps, means connecting each of certain secondary winding taps with a primary winding tap of the succeeding interval of said transformer, means adapting one end of said primary winding and one of the taps of said primary winding for connection to a source of potential, and means adapting one end of said primary winding and one of the taps of said secondary winding for connection to a load circuit.

5. An electrical transformer comprising a winding having a first conductor and a second conductor, said first and second conductors being in close proximity along their common length, taps disposed on each of said first and second conductors which divide said winding into predetermined intervals, magnetic core means inductively associated with each of said winding intervals, means connecting the second conductor of one winding interval to the first conductor of the succeeding winding interval, input means connected to said first conductor, and output means connected between said first conductor and said second conductor.

6. An electrical transformer comprising, a coil having inner and outer spaced coaxial conductors, taps disposed adjacent one another on said inner and outer conductors at predetermined intervals along said coil, means interconnecting certain of said taps to connect the outer conductor of one interval of said coil to the inner conductor of the succeeding interval of said coil, an input circuit connected between one end of one of said conductors and a tap along said one conductor other than the first tap from said one end, and an output circuit connected between said one end of said one conductor and the other end of the other of said conductors.

7. An electrical transformer comprising a winding having first and second ends, said winding including inner and outer spaced coaxially disposed conductors, taps connected to proximal points of said inner and outer conductors at intervals along said winding, means interconecting said taps to connect the outer conductor of one winding interval to the inner conductor of the suceeding winding interval, first means for connecting the winding to an external circuit joined to one conductor at the first end of the winding and to a tap other than the first tap from the first end on said one conductor, and second means for connecting the winding to an external circuit joined to the other conductor at the second end of the winding and to said one conductor at the first end of the winding.

References Cited by the Examiner

UNITED STATES PATENTS

| | | | |
|---|---|---|---|
| 2,521,513 | 9/1950 | Gray | 336—223 X |
| 2,849,526 | 8/1958 | Brockbank | 174—107 |
| 2,916,615 | 12/1959 | Lundburg | 340—173 X |

FOREIGN PATENTS

| | | |
|---|---|---|
| 698,872 | 10/1953 | Great Britain. |

ROBERT K. SCHAEFER, *Primary Examiner.*

D. J. BADER, *Assistant Examiner.*